United States Patent
Iseki et al.

(10) Patent No.: US 9,121,567 B2
(45) Date of Patent: Sep. 1, 2015

(54) TURN LAMP FOR VEHICLE OUTSIDE MIRROR

(71) Applicant: MURAKAMI CORPORATION, Shizuoka (JP)

(72) Inventors: Kota Iseki, Shizuoka (JP); Hiroaki Nagano, Yaizu (JP); Akihito Inaba, Yaizu (JP)

(73) Assignee: MURAKAMI CORPORATION, Shizuoka (JP)

( * ) Notice: Subject to any disclaimer, the term of this patent is extended or adjusted under 35 U.S.C. 154(b) by 73 days.

(21) Appl. No.: 14/136,904

(22) Filed: Dec. 20, 2013

(65) Prior Publication Data

US 2014/0177249 A1    Jun. 26, 2014

(30) Foreign Application Priority Data

Dec. 25, 2012    (JP) .................................. 2012-281171

(51) Int. Cl.
| | |
|---|---|
| *F21S 8/10* | (2006.01) |
| *B60Q 1/26* | (2006.01) |
| *B60R 1/06* | (2006.01) |
| *B60R 1/12* | (2006.01) |

(52) U.S. Cl.
CPC ............... *F21S 48/23* (2013.01); *B60Q 1/2665* (2013.01); *B60R 1/06* (2013.01); *B60R 1/12* (2013.01); *B60R 1/1207* (2013.01); *F21S 48/211* (2013.01); *F21S 48/215* (2013.01); *F21S 48/225* (2013.01); *F21S 48/2206* (2013.01); *F21S 48/2212* (2013.01); *F21S 48/2243* (2013.01); *F21S 48/2268* (2013.01); *F21S 48/2281* (2013.01); *F21S 48/232* (2013.01); *F21S 48/238* (2013.01); *F21S 48/24* (2013.01); *F21S 48/31* (2013.01)

(58) Field of Classification Search
CPC ... F21S 48/2231; F21S 48/2281; F21S 48/23; F21S 48/215; F21S 48/2212; F21S 48/225; F21S 48/232; F21S 48/24; F21S 48/211; F21S 48/2206; F21S 48/2243; F21S 48/2268; F21S 48/238; F21S 48/31; F21S 8/10; B60Q 1/2665; B60R 1/06; B60R 1/1207; B60R 1/12
See application file for complete search history.

(56) References Cited

U.S. PATENT DOCUMENTS

| | | | |
|---|---|---|---|
| 6,926,432 B2 * | 8/2005 | Rodriguez Barros et al. .......................... | 362/494 |
| 2003/0169160 A1 * | 9/2003 | Rodriguez Barros et al. ........................ | 340/426.1 |
| 2004/0257790 A1 * | 12/2004 | Tanaka et al. ................... | 362/23 |
| 2010/0053986 A1 | 3/2010 | Ishikawa | |
| 2011/0261570 A1 * | 10/2011 | Okada et al. ............ | 362/311.06 |

FOREIGN PATENT DOCUMENTS

| | | |
|---|---|---|
| JP | 2006-114309 A | 4/2006 |
| JP | 2010-052566 A | 3/2010 |

* cited by examiner

*Primary Examiner* — Bao Q Truong
(74) *Attorney, Agent, or Firm* — Greenblum & Bernstein, P.L.C.

(57) ABSTRACT

While a light source is arranged on the back side of a light guide lens, light beams can be emitted from the light source with respective optical axes directed in one direction and be guided toward opposite ends of the light guide lens. A light source and a reflective surface are arranged on the back side of a light guide lens. The light source emits light beams with respective optical axes directed in one direction. One of the light beams obliquely enters the light guide lens toward one end in a long direction of the light guide lens without being reflected by the reflective surface. Another one of the light beams is reflected by the reflective surface and obliquely enters the light guide lens toward another end in the long direction of the light guide lens.

15 Claims, 4 Drawing Sheets

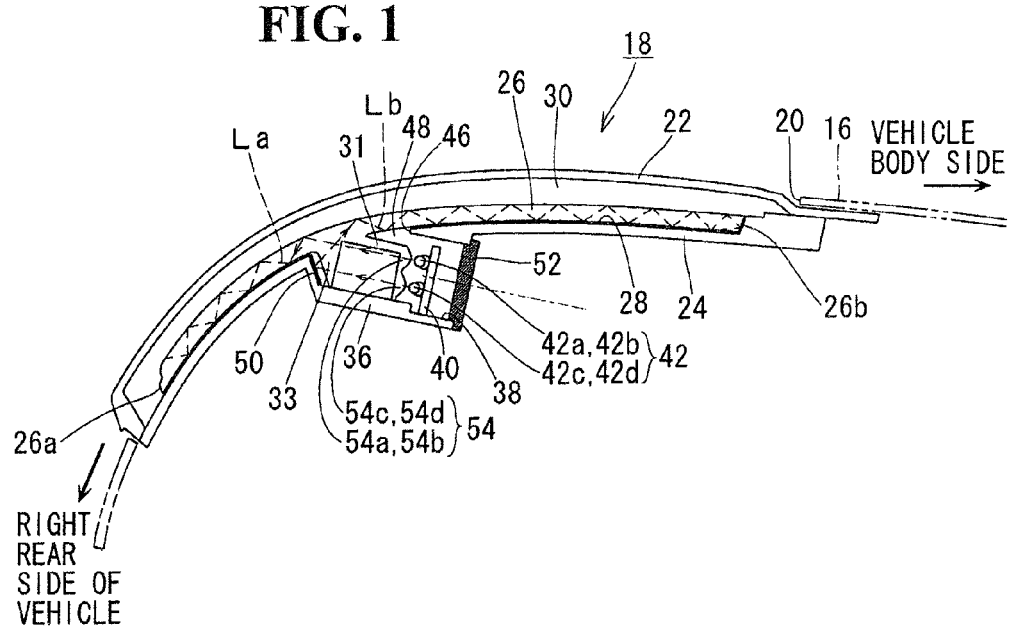
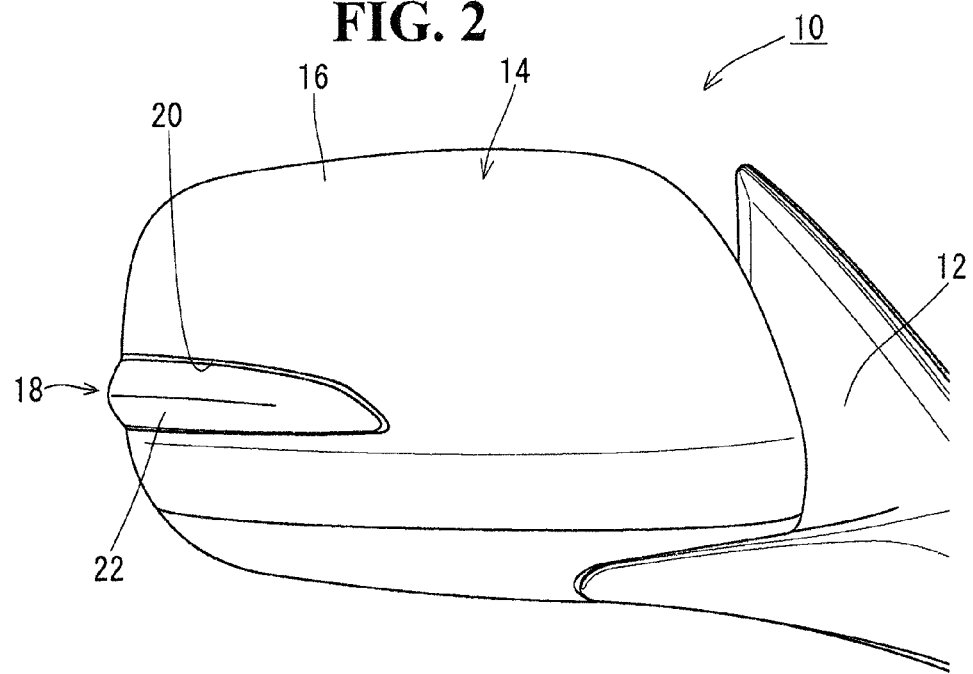

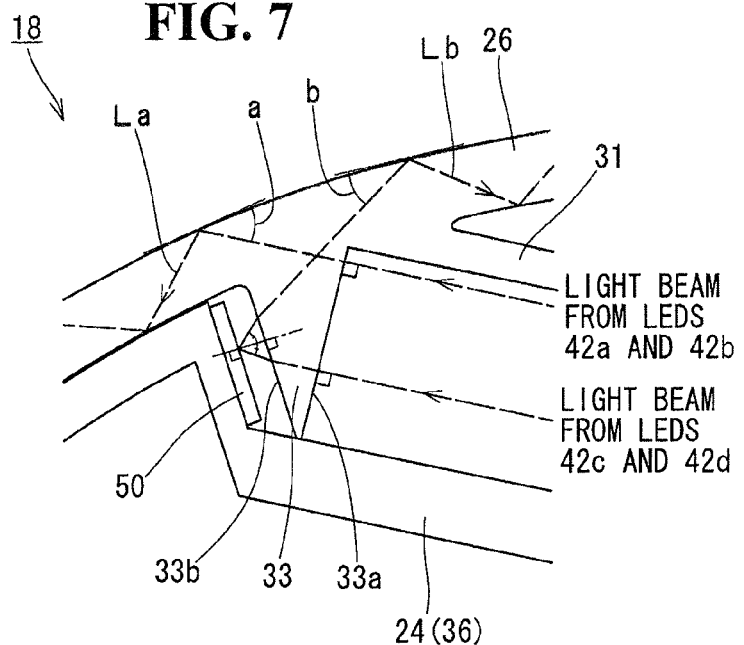
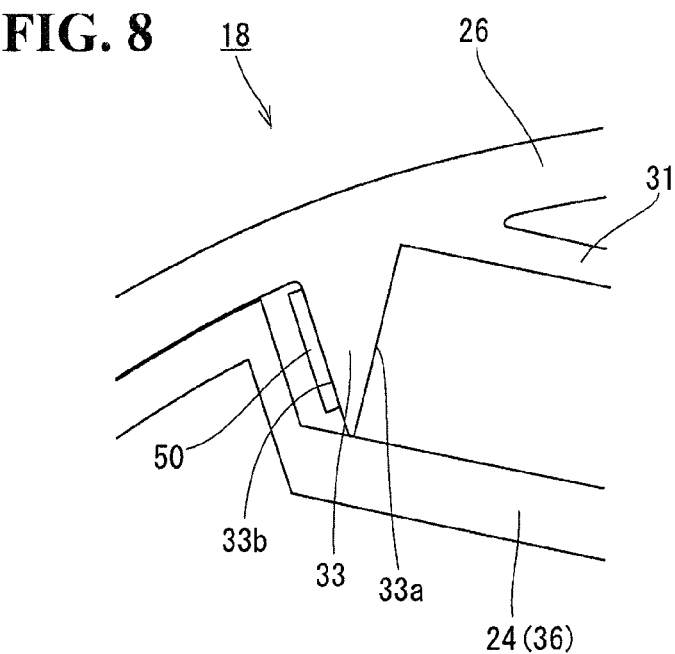

TURN LAMP FOR VEHICLE OUTSIDE MIRROR

The disclosure of Japanese Patent Application No. JP2012-281171 filed on Dec. 25, 2012 including the specification, drawings, claims and abstract is incorporated herein by reference in its entirety.

BACKGROUND OF THE INVENTION

1. Field of the Invention

The present invention relates to a turn lamp to be assembled to a vehicle outside mirror, which enables light beams from a light source to be emitted with respective optical axes directed in one direction and be guided toward opposite ends of a light guide lens while the light source is arranged on the back side of the light guide lens.

2. Description of the Related Art

As examples of a vehicle door mirror equipped with a turn lamp, there are ones described in Japanese Patent Laid-Open Nos. 2006-114309 and 2010-052566. The turn lamp described in Japanese Patent Laid-Open No. 2006-114309 is one with a light source arranged at an end in a long direction (in other words, long length direction or longitudinal direction, etc.) of a light guide lens. The turn lamp described in Japanese Patent Laid-Open No. 2010-052566 is one with a light source arranged on the back side of a light guide lens.

In the turn lamp described in Japanese Patent Laid-Open No. 2006-114309, a light source is arranged at an end of a light guide lens, providing an advantage of being able to guide light over an entire length of the light guide lens by emitting light beams from the light source with respective optical axes directed in one direction; however, there is a problem of an increase in entire length of the turn lamp. Meanwhile, in the turn lamp described in Japanese Patent Laid-Open No. 2010-052566, light sources are arranged on the back side of a light guide lens, providing the advantage of suppression of an entire length of the turn lamp; however, it is necessary to make light beams from the light sources be emitted in different directions: a direction toward one end of the light guide lens and a direction toward another end.

The present invention aims to solve the problems in the conventional techniques mentioned above and provide a turn lamp that enables light beams to be emitted from a light source with respective optical axes directed in one direction and be guided toward opposite ends of a light guide lens while the light source is arranged on the back side of the light guide lens.

SUMMARY OF THE INVENTION

The present invention provides a turn lamp for a vehicle outside mirror, the turn lamp including a light guide lens having an elongated shape with a shape of a front surface having a long direction (in other words, long length direction or longitudinal direction, etc.) and a short direction (in other words, short length direction or transversal direction or lateral direction, etc.), the light guide lens including a transparent material, and a light source arranged on a back side of the light guide lens, a light beam emitted from the light source entering a predetermined position on the back side of the light guide lens and being radiated from surfaces of respective parts of the light guide lens to an outside of the light guide lens while being guided inside the light guide lens, the turn lamp including a reflective surface arranged on the back side of the light guide lens, wherein the light source emits a light beam with an optical axis directed in one direction; wherein a part of the light beam emitted from the light source obliquely enters the light guide lens toward one end in the long direction of the light guide lens without being reflected by the reflective surface; and wherein another part of the light beam emitted from the light source is reflected by the reflective surface and obliquely enters the light guide lens toward another end in the long direction of the light guide lens. Consequently, while the light source is arranged on the back side of the light guide lens, a light beam can be emitted from the light source with an optical axis directed in one direction and guided toward opposite ends of the light guide lens.

In the present invention, it is possible that the position where the light beam enters the light guide lens is set at a middle portion in the long direction of the light guide lens. Consequently, as a result of the light source being arranged on the back side of the light guide lens, even if a bulge portion is generated by the light source on a back surface of the turn lamp, a position in the long direction of the light guide lens where the light source is arranged can favorably be selected. Accordingly, the bulge portion can be arranged at a position that avoids interference with structures such as a frame, a power folding unit and a mirror surface angle adjustment actuator inside a door mirror, preventing a degree of freedom in designing an internal structure of the door mirror from being impaired.

In the present invention, it is possible that: the light source includes a first LED and a second LED with respective optical axes directed in a same direction; a light beam emitted from the first LED is guided inside the light guide lens toward the one end of the light guide lens without substantially being reflected by the reflective surface; and a light beam emitted from the second LED is substantially reflected by the reflective surface and guided inside the light guide lens toward the other end of the light guide lens. Consequently, by arranging the first LED and the second LED with a proper space therebetween, a light beam entering the light guide lens off the reflective surface and a light beam entering the light guide lens after falling on the reflective surface can easily be separated from each other. In this case, it is possible that: the first LED is arranged at a position closer to the light guide lens than the second LED, and the second LED is arranged at a position further from the light guide lens than the first LED; the light beam emitted from the first LED travels in a straight line and obliquely enters the light guide lens toward the one end; and the light beam emitted from the second LED is reflected by the reflective surface and obliquely enters the light guide lens toward the other end. Consequently, the simple arrangement of the first and second LEDs enables the light beams to be divided and enter the light guide lens toward the opposite ends of the light guide lens. Also, in the aforementioned structure described in Japanese Patent Laid-Open No. 2010-052566, two LEDs are arranged outward from each other, resulting in the problem of the area between the two LEDs tending to be dark. Meanwhile, according to this aspect of the present invention, a position of entrance of the light beam directed to the one end of the light guide lens and a position of entrance of the light beam directed to the other end can be arranged to close to each other, enabling suppression of the darkening of the area between the positions of entrance.

In the present invention, it is possible that the first LED and the second LED are mounted on one substrate with the respective optical axes directed in the same direction. In the aforementioned structure described in Japanese Patent Laid-Open No. 2010-052566, it is necessary to mount two LEDs on separate substrates and arrange the LEDs with respective optical axes in directions different from each other, resulting in the problem of taking trouble in the work of mounting two LEDs in separate substrates and the work of assembling the respective substrates to a turn lamp. Meanwhile, according to this aspect of the present invention, the first LED and the second LED may be mounted on one substrate with respective optical axes directed in a same direction, facilitating the work of mounting the first and second LEDs on a substrate and the work of assembling the substrate to a turn lamp.

In the present invention, it is possible that the reflective surface is arranged on a lamp housing arranged on the back side of the light guide lens. Consequently, the reflective surface can be arranged on the lamp housing side. Also, in the present invention, it is possible that the reflective surface is arranged on the light guide lens. Consequently, the reflective surface can be arranged on the light guide lens side.

In the present invention, it is possible that: the turn lamp further including a convex lens that converts the light beam emitted from the light source into collimated light; and a part of the collimated light resulting from the conversion enters the light guide lens without being reflected by the reflective surface, and another part of the collimated light is reflected by the reflective surface and enters the light guide lens. Consequently, the light beam emitted from the light source can efficiently enter the light guide lens toward the opposite ends of the light guide lens without diffusing widely. In this case, it is possible that the convex lens is configured in such a manner that the convex lens is integrated with the light guide lens on the back side of the light guide lens using a material that is the same as that of the light guide lens. Consequently, since the light guide lens and the convex lens are integrated with each other, the work of assembling the light guide lens and the convex lens to a turn lamp is facilitated. Also, misalignment between the light guide lens and the convex lens is prevented.

In the present invention, it is possible that: the light guide lens includes a projection configured in such a manner that the projection is integrated with the light guide lens on the back side of the light guide lens using a material that is the same as that of the light guide lens; the projection includes a first surface allowing the light beam from the light source to enter at a right angle to an optical axis of the light beam, and a second surface arranged in parallel to the reflective surface on a side opposite to the first surface or arranged at a surface that is the same as the reflective surface on the side opposite to the first surface; a part of the light beam that has entered from the first surface enters the light guide lens off the second surface and is guided toward the one end of the light guide lens; and another part of the light beam that has entered from the first surface falls on the second surface, is reflected by the reflective surface, enters the light guide lens and is guided toward the other end of the light guide lens. Consequently, as a result of the light beam entering the light guide lens through the projection, the light beam can efficiently enter the light guide lens. Also, the influence of refraction when the light beam from the light source obliquely enters the light guide lens (body portion of the light guide lens not including the projection) can be reduced.

BRIEF DESCRIPTION OF THE DRAWINGS

FIG. 1 is a cross-sectional view along arrow A-A (in a long direction of a light guide lens) of the turn lamp in FIG. 4;

FIG. 2 is a back view of a door mirror equipped with the turn lamp in FIG. 4;

FIG. 7 is an enlarged view of an area including the projection, the reflective surface and a part of the light guide lens around positions where light beams enter in the light guide lens in FIG. 1; and FIG. 8 is a diagram illustrating an alteration of the embodiment illustrated in FIGS. 1 to 7, which is an enlarged view of an area corresponding to the area including the projection, the reflective surface and the part of the light guide lens around positions where light beams enter in the light guide lens in FIG. 1.

DETAILED DESCRIPTION OF THE PREFERRED EMBODIMENT

Figure 3:
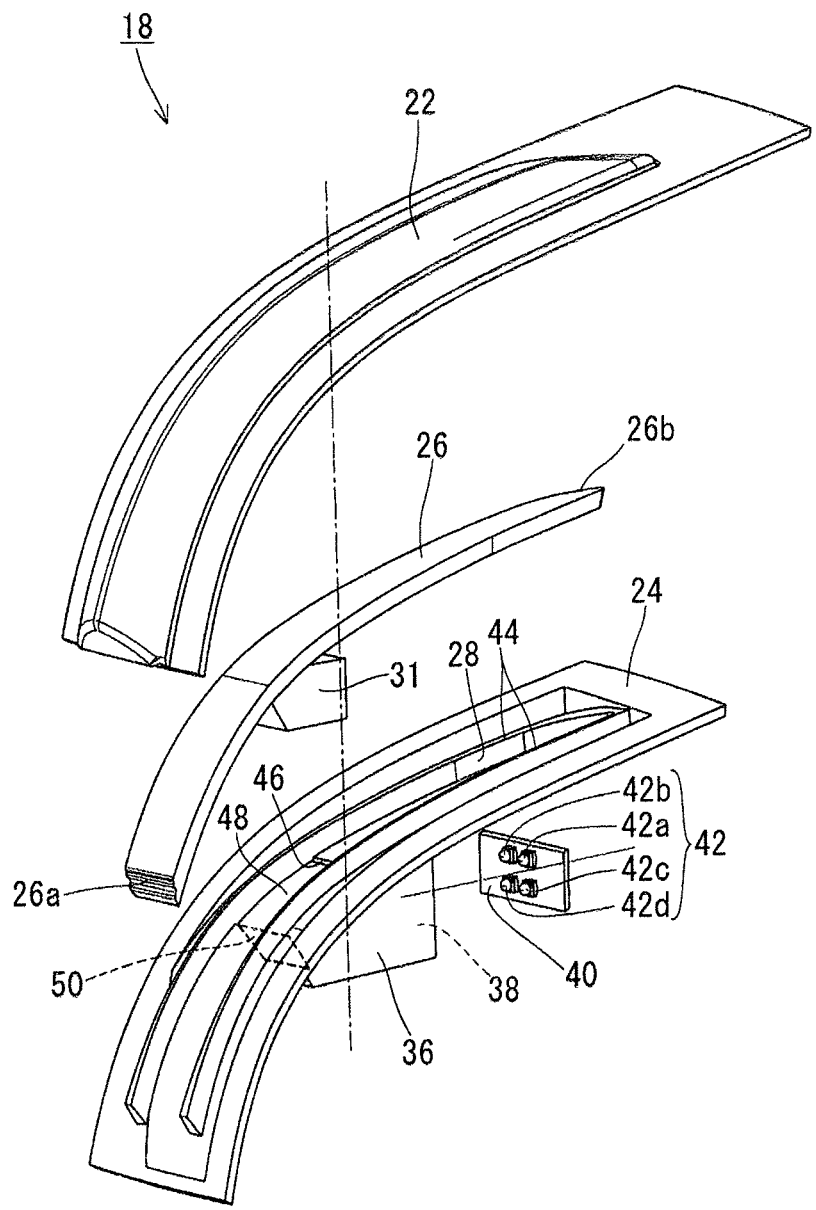
FIG. 3 is an exploded perspective view of the turn lamp in FIG. 4.

An embodiment of the present invention will be described below. FIG. 2 illustrates a right-side door mirror 10 equipped with a turn lamp according to the present invention. The door mirror 10 includes a mirror base 12 fixed to a vehicle body (right door) (not illustrated), and a mirror body 14 pivotably attached to and supported by the mirror base 12 so as to be able to move between a used position and a folded position. In the mirror body 14, a frame, a power folding unit and a mirror surface angle adjustment actuator both supported by the frame, a mirror holder supported by the mirror surface angle adjustment actuator in such a manner that a mirror surface angle can be adjusted, a mirror plate fixed to and held by the mirror holder (these are not illustrated), and a turn lamp 18 are arranged and housed inside a mirror housing 16. In the mirror housing 16, a cut portion 20 is formed from a roughly center portion in a width direction of the back side thereof (vehicle front side) to the outer side (side away from the vehicle body) as to extend in a horizontal direction, and an outer lens 22 of the turn lamp 18 is exposed from the cut portion 20 in a projecting manner. The outer lens 22 is formed as to curve in the horizontal direction (long direction) along a curved surface of the mirror housing 16. Turn signal light emitted from an entire exposed surface of the turn lamp 18 can be viewed from all of areas from the front side to the right rear side of the vehicle.

Figure 5:
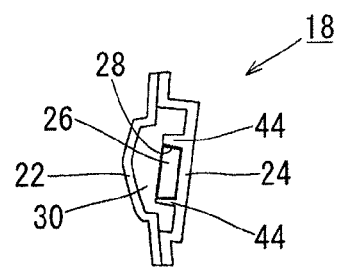
FIG. 5 is a cross-sectional view along arrow B-B (in a short direction of the light guide lens) of the turn lamp in FIG. 4.

A configuration of the turn lamp 18 will be described. FIG. 3 is an exploded perspective view of the turn lamp 18. The turn lamp 18 includes a lamp housing 24 formed of an opaque plastic material, and a light guide lens 26 and an outer lens 22 each formed of a transparent plastic material such as a PMMA resin. The lamp housing 24 includes a holding portion that holds the transparent light guide lens 26. The transparent outer lens 22 provides a cover for the light guide lens 26. The lamp housing 24 is formed in a rectangular shape in its entirety. The light guide lens 26 has a flat plate shape, and a shape of a front surface thereof is formed in an elongated shape having a long direction and a short direction. The outer lens 22 is formed in a rectangular shape having a size substantially the same as that of the lamp housing 24, in its entirety. The lamp housing 24 and the light guide lens 26 are formed so as to curve in the long direction along the outer lens 22. The light guide lens 26 is put in a recess part 28 at a front surface of the lamp housing 24, fitted in, and fixed to the lamp housing 24 by, e.g. bonding, the outer lens 22 is put on the lamp housing 24, and the lamp housing 24 and the outer lens 22 are joined to each other by, e.g., welding or bonding at respective peripheral portions in which the lamp housing 24 and the outer lens 22 come into contact with each other, whereby the lamp housing 24 and the outer lens 22 are integrated in such a manner that the light guide lens 26 is housed in an internal space 30 (FIGS. 1 and 5).

In FIG. 3, at a middle portion in the long direction on the back side of the light guide lens 26, a box-shaped portion 31 that opens downward is configured in such a manner that the box-shaped portion 31 is integrated with the light guide lens 26 using a transparent plastic material that is the same as that of the light guide lens 26. Also, on the back side of the lamp housing 24, a box-shaped housing portion 36 is provided in such a manner that the housing portion 36 is integrated with the lamp housing 24 using an opaque plastic material that is the same as that of the lamp housing 24. The housing portion 36 houses the box-shaped portion 31 and a substrate 40 with a light source 42 mounted thereon. The housing portion 36 includes an opening 38 at a side thereof, and the substrate 40 with the light source 42 mounted thereon is put in the housing portion 36 via the opening 38 and fixed to the housing portion 36. On the substrate 40, a plurality of LEDs 42 which constitute the light source 42 are mounted with respective optical axes directed in a same direction that is at right angle with a surface of the substrate 40. In this example, the light source 42 includes four LEDs 42a, 42b, 42c and 42d arrayed in a quadrangular shape. From among the LEDs, the LEDs 42a and 42b provide first LEDs arranged at respective positions close to the light guide lens 26, and the LEDs 42c and 42d provide second LEDs arranged at respective positions far from the light guide lens 26. Turn signal light is emitted from each of the LEDs 42a, 42b, 42c and 42d.

Figure 4:
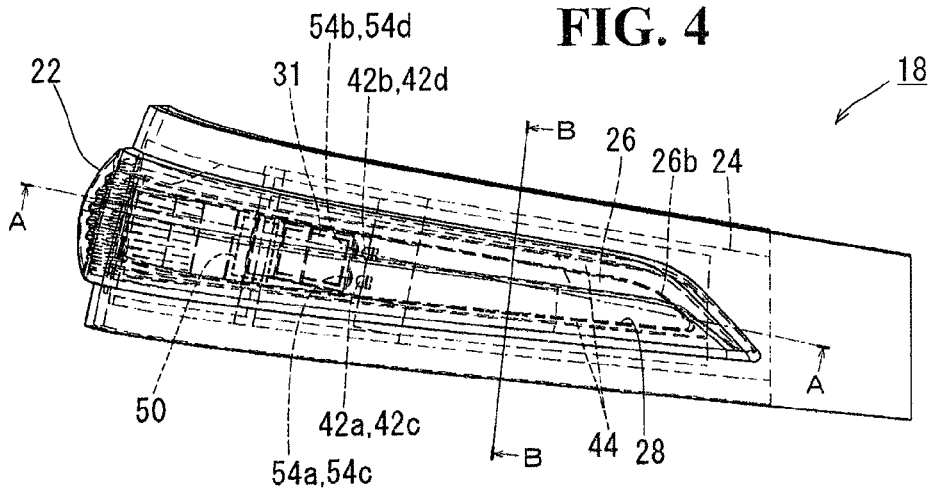
FIG. 4 is a front view of an embodiment of a turn lamp according to the present invention.
Figure 6:
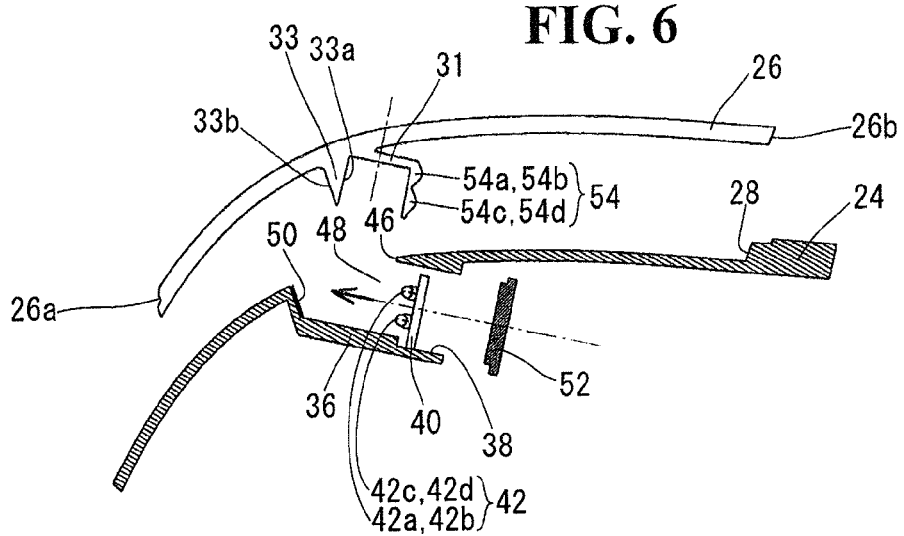
FIG. 6 is an exploded cross-sectional view along arrow A-A of the turn lamp in FIG. 4 (an outer lens not illustrated)

FIG. 4 illustrates an assembled state of the turn lamp 18 in FIG. 3. Also, FIGS. 1 and 5 illustrate a cross-section along arrow A-A in FIG. 4 and a cross-section along arrow B-B in FIG. 4, respectively. Also, FIG. 6 illustrates an exploded cross-section along arrow A-A in FIG. 4 with the outer lens 22 excluded. As illustrated in FIG. 5, a recess part 28 that houses the light guide lens 26 is configured as an empty space surrounded by a light leakage prevention rib 44 formed at the front surface of the lamp housing 24. As a result of the light guide lens 26 being housed in the recess part 28, light leakage from upper and lower edge surfaces of the light guide lens 26 is prevented.

When the light guide lens 26 is put in the recess part 28, the box-shaped portion 31 formed at a back surface of the light guide lens 26 is put in an internal space 48 of the housing portion 36 formed at a back surface of the lamp housing 24 via an opening 46 formed at the front surface of the lamp housing 24. On a surface on the deep side of the housing portion 36, a reflective surface 50 is arranged by, e.g., film formation of a metal reflective film or adhesion of a film member coated with a metal reflective film, or adhesion of a metal plate. The reflective surface 50 is arranged on a region that corresponds to only a part of an entire length in the long direction of the light guide lens 26. Accordingly, if a light beam is projected from the back side of the light guide lens 26, depending on the position where the light beam is projected, the light beam directly enters the light guide lens 26 (plate-shaped part excluding the box-shaped portion 31 including the later-described projection 33) without falling on the reflective surface 50 or enters the light guide lens 26 after falling on and being reflected by the reflective surface 50. The substrate 40 with the LEDs 42 mounted thereon is put and fitted in the housing portion 36 and fixed to the housing portion 36 by, e.g., bonding or screw fastening. After the substrate 40 is put in and fixed to the housing portion 36, the opening 38 of the housing portion 36 is occluded by bonding a lamp cover 52 to the housing portion 36. Electric wires (not illustrated) connected to the LEDs 42 are drawn to the outside of the turn lamp 18 through the lamp cover 52. At a front wall of the box-shaped portion 31 that faces the four LEDs 42 (42a, 42b, 42c and 42d), four convex lenses 54 (54a, 54b, 54c and 54d) that convert light beams emitted from the LEDs 42 (42a, 42b, 42c and 42d) into collimated light are formed. A rear wall of the box-shaped portion 31 provides a projection 33 having a wedge shape in a cross section. A front surface 33a of the projection 33 is at right angle with the optical axes of the respective LEDs 42 and a rear surface 33b of the projection 33 is parallel with the reflective surface 50.

Light beam paths of turn signal light from the turn lamp 18 having the configuration described above are indicated in dashed lines La and Lb in FIG. 1. The light beam La is a light beam emitted from the first LEDs 42a and 42b, and the light beam Lb is a light beam emitted from the second LEDs 42c and 42d. The light beam La emitted from the LEDs 42a and 42b is converted into collimated light by the convex lenses 54a and 54b and then obliquely enters the light guide lens 26 toward one end 26a (end at a position far from the vehicle body) of the light guide lens 26, and while the light is repeatedly subjected to internal reflection (total reflection resulting from an incident angle exceeding a critical angle at an interface with the air) inside the light guide lens 26, the light is radiated little by little to the outside at each part, and finally, the light reaches the end 26a and is radiated toward the right rear side of the vehicle. The light beam Lb emitted from the LEDs 42c and 42d is converted into collimated light by the convex lenses 54c and 54d and is reflected by the reflective surface 50 and then obliquely enters the light guide lens 26 toward another end 26b (end at a position close to the vehicle body), and while the light is repeatedly subjected to internal reflection inside the light guide lens 26 until the light reaches the other end 26b, the light is radiated little by little to the outside. Consequently, turn signal light is emitted from all regions in the long and short directions of the light guide lens 26. The turn signal light emitted from the light guide lens 26 passes through the outer lens 22 and is radiated to the outside, and can be viewed from all of the areas from the front side to the right rear side of the vehicle.

FIG. 7 is an enlarged view of a part around positions where the light beams La and Lb enter the light guide lens 26 in FIG. 1. The light beam La emitted from the LEDs 42a and 42b and converted into collimated light by the convex lenses 54a and 54b enters the projection 33 at right angle with the front surface 33a of the projection 33 (that is, without refraction), travels in a straight line off the rear surface 33b and the reflective surface 50 and directly obliquely enters the light guide lens 26 (plate-shaped portion excluding the box-shaped portion 31 including the projection 33) toward the end 26a of the light guide lens 26 (with an angle a of the optical axis relative to a tangent in the long direction of the light guide lens 26 at the position of entrance as a sharp angle) and is guided toward the end 26a. Also, the light beam Lb emitted from the LEDs 42c and 42d and converted into collimated light by the convex lenses 54c and 54d enters the projection 33 at right angle with the front surface 33a of the projection 33, travels in a straight line, exits from the rear surface 33b, is reflected by the reflective surface 50, and enters the projection 33 again from the rear surface 33b, and obliquely enters the light guide lens 26 (plate-shaped portion excluding the box-shaped portion 31 including the projection 33) toward the other end 26b of the light guide lens 26 (with an angle b of the optical axis relative to the tangent in the long direction of the light guide lens 26 at the position of entrance as a sharp angle) and is guided toward the other end 26b. In this case, the reflective surface 50 is parallel with the rear surface 33b, and thus, an angle change of the light beam Lb due to refraction when the light beam Lb exits from the rear surface 33b is cancelled by an angle change of the light beam Lb due to refraction when the light beam Lb enters the projection 33 again from the rear surface 33b. The angles a and b when the light beams La and Lb enter the light guide lens 26 are substantially equal to each other. As a result of the light beams La and Lb entering the light guide lens 26 through the projection 33, the light beams La and Lb can efficiently enter the light guide lens 26. Also, since the optical axes of the light beams La and Lb are at right angle with the front surface 33a of the projection 33 and the rear surface 33b of the projection 33 is parallel with the reflective surface 50, the influence of refraction when the light beams La and Lb obliquely entering the light guide lens 26 can be reduced.

FIG. 8 illustrates an alteration of the embodiment described above. This is one resulting from arranging a reflective surface 50 on a rear surface 33b of a projection 33 by, e.g., film formation of a metal reflective film, adhesion of a film member coated with a metal reflective film or adhesion of a metal plate. The rest of the configuration is the same as that of the embodiment described above.

Although the above embodiment has been described in terms of a case where a reflective surface is arranged by, e.g., film formation of a metal reflective film, adhesion of a film member coated with a metal reflective film or adhesion of a metal plate, instead, a reflective surface can be arranged using internal reflection by a transparent member itself, which constitutes the light guide lens (for example, internal reflection by the rear surface 33b of the projection 33 in the above embodiment). Consequently, a need to use, e.g., a metal reflective film, a film member coated with a metal reflective film or a metal plate can be eliminated. Also, although in the above embodiment, the convex lenses 54 are configured in such a manner that the convex lenses 54 are integrated with the light guide lens 26, instead, convex lenses 54 can be configured separately from the light guide lens 26 and fixed to a substrate 40 or LEDs 42. Also, although in the above embodiment, LEDs are used as a light source, instead, incandescent bulbs or other light sources can be used as a light source. Also, although in the above embodiment, a plurality of light sources is used, only one light source can be used if the light source has a sufficient luminance. In this case, the one light source can be arranged in such a manner that a part (for example, a half) of a range irradiated with a light beam emitted from the light source falls on a reflective surface and another part (for example, the remaining half) travels off the reflective surface. Also, although in the above embodiment, the optical axis of the light source 42 is directed toward the end 26a located at a position far from the vehicle body, as opposed to this, an optical axis of a light source 42 can be directed toward an end 26b located at a position close to the vehicle body. Also, a separate reflective surface can be formed on a back surface of a light guide lens 26 or an inner surface of a recess part 28 of a lamp housing 24 by, e.g., film formation of a metal reflective film, adhesion of a film member coated with a metal reflective film or adhesion of a metal plate to enhance the use efficiency of light beams. Also, although in the above embodiment, the box-shaped portion 31 including the projection 33 is configured in such a manner that the box-shaped portion 31 is integrated with the light guide lens 26, instead, a box-shaped portion 31 including a projection 33 can be configured separately from a light guide lens 26 and joined to a back surface of the light guide lens 26 by, e.g., a transparent adhesive. Also, although the above embodiment has been described in terms of a case where the present invention is applied to a turn lamp for a right-side door mirror, the present invention can also be applied to any of turn lamps for various types of vehicle outside mirrors such as a left-side door mirrors and left and right-side fender mirrors.

DESCRIPTION OF SYMBOLS

10 ... door mirror (vehicle outside mirror), 18 ... turn lamp, 24 ... lamp housing, 26 ... light guide lens, 26a, 26b ... end of light guide lens, 33 ... projection, 33a ... front surface (first surface) of projection, 33b ... rear surface (second surface) of projection, 40 ... substrate, 42 ... light source (LED), 42a, 42b ... first LED, 42c, 42d ... second LED, 50 ... reflective surface, 54 (54a, 54b, 54c, 54d) ... convex lens, La, Lb ... light beam (optical axis)

What is claimed is:

1. A turn lamp for a vehicle outside mirror, the turn lamp comprising a light guide lens having an elongated shape with a shape of a front surface having a long direction and a short direction, the light guide lens including a transparent material, and a light source arranged on a back side of the light guide lens, a light beam emitted from the light source entering a predetermined position on the back side of the light guide lens and being radiated from surfaces of respective parts of the light guide lens to an outside of the light guide lens while being guided inside the light guide lens,
    wherein the turn lamp includes a reflective surface arranged on the back side of the light guide lens,
    wherein the light source emits a light beam with an optical axis directed in one direction;
    wherein a part of the light beam emitted from the light source obliquely enters the light guide lens toward one end in the long direction of the light guide lens without being reflected by the reflective surface; and
    wherein another part of the light beam emitted from the light source is reflected by the reflective surface and obliquely enters the light guide lens toward another end in the long direction of the light guide lens.

2. The turn lamp for a vehicle outside mirror according to claim 1, wherein the position where the light beam enters the light guide lens is set at a middle portion in the long direction of the light guide lens.

3. The turn lamp for a vehicle outside mirror according to claim 1,
    wherein the light source includes a first LED and a second LED with respective optical axes directed in a same direction;
    wherein a light beam emitted from the first LED is guided inside the light guide lens toward the one end of the light guide lens without substantially being reflected by the reflective surface; and
    wherein a light beam emitted from the second LED is substantially reflected by the reflective surface and guided inside the light guide lens toward the other end of the light guide lens.

4. The turn lamp for a vehicle outside mirror according to claim 2,
    wherein the light source includes a first LED and a second LED with respective optical axes directed in a same direction;
    wherein a light beam emitted from the first LED is guided inside the light guide lens toward the one end of the light guide lens without substantially being reflected by the reflective surface; and
    wherein a light beam emitted from the second LED is substantially reflected by the reflective surface and guided inside the light guide lens toward the other end of the light guide lens.

5. The turn lamp for a vehicle outside mirror according to claim 3,
- wherein the first LED is arranged at a position closer to the light guide lens than the second LED, and the second LED is arranged at a position further from the light guide lens than the first LED;
- wherein the light beam emitted from the first LED travels in a straight line and obliquely enters the light guide lens toward the one end; and
- wherein the light beam emitted from the second LED is reflected by the reflective surface and obliquely enters the light guide lens toward the other end.

6. The turn lamp for a vehicle outside mirror according to claim 4,
- wherein the first LED is arranged at a position closer to the light guide lens than the second LED, and the second LED is arranged at a position further from the light guide lens than the first LED;
- wherein the light beam emitted from the first LED travels in a straight line and obliquely enters the light guide lens toward the one end; and
- wherein the light beam emitted from the second LED is reflected by the reflective surface and obliquely enters the light guide lens toward the other end.

7. The turn lamp for a vehicle outside mirror according to claim 3, wherein the first LED and the second LED are mounted on one substrate with the respective optical axes directed in the same direction.

8. The turn lamp for a vehicle outside mirror according to claim 4, wherein the first LED and the second LED are mounted on one substrate with the respective optical axes directed in the same direction.

9. The turn lamp for a vehicle outside mirror according to claim 5, wherein the first LED and the second LED are mounted on one substrate with the respective optical axes directed in the same direction.

10. The turn lamp for a vehicle outside mirror according to claim 6, wherein the first LED and the second LED are mounted on one substrate with the respective optical axes directed in the same direction.

11. The turn lamp for a vehicle outside mirror according to claim 1, wherein the reflective surface is arranged on a lamp housing arranged on the back side of the light guide lens.

12. The turn lamp for a vehicle outside mirror according to claim 1, wherein the reflective surface is arranged on the light guide lens.

13. The turn lamp for a vehicle outside mirror according to claim 1, further comprising a convex lens that converts the light beam emitted from the light source into collimated light, wherein a part of the collimated light resulting from the conversion enters the light guide lens without being reflected by the reflective surface, and another part of the collimated light is reflected by the reflective surface and enters the light guide lens.

14. The turn lamp for a vehicle outside mirror according to claim 13, wherein the convex lens is configured in such a manner that the convex lens is integrated with the light guide lens on the back side of the light guide lens using a material that is the same as that of the light guide lens.

15. The turn lamp for a vehicle outside mirror according to claim 1,
- wherein the light guide lens includes a projection configured in such a manner that the projection is integrated with the light guide lens on the back side of the light guide lens using a material that is the same as that of the light guide lens;
- wherein the projection includes a first surface allowing the light beam from the light source to enter at a right angle to an optical axis of the light beam, and a second surface arranged in parallel to the reflective surface on a side opposite to the first surface or arranged at a surface that is the same as the reflective surface on the side opposite to the first surface;
- wherein a part of the light beam that has entered from the first surface enters the light guide lens off the second surface and is guided toward the one end of the light guide lens; and
- wherein another part of the light beam that has entered from the first surface falls on the second surface, is reflected by the reflective surface, enters the light guide lens and is guided toward the other end of the light guide lens.

* * * * *